United States Patent [19]

Hintz et al.

[11] Patent Number: 5,628,581

[45] Date of Patent: May 13, 1997

[54] SHEET METAL CONSTRUCTION SYSTEM

[75] Inventors: Michael D. Hintz, Canby, Oreg.; Craig S. Ludwig, White Salmon, Wash.; Laird L Richardson, Colton, Oreg.

[73] Assignee: PACE Company, Portland, Oreg.

[21] Appl. No.: 391,697

[22] Filed: Feb. 17, 1995

[51] Int. Cl.$^6$ ........................ F16B 5/04
[52] U.S. Cl. .............. 403/408.1; 403/380; 403/384; 403/387; 411/41
[58] Field of Search .................... 403/380, 381, 403/363, 408.1, 13, 14, 167, 168, 279–282, 277, 332, 333, 387–388, 384, 376, 337, 287; 411/41, 45, 46, 48, 60; 52/765, 775, 454, 36.5

[56] References Cited

U.S. PATENT DOCUMENTS

| | | | |
|---|---|---|---|
| 2,302,772 | 11/1942 | Huck | 403/388 X |
| 2,767,951 | 10/1956 | Cousino | 403/387 X |
| 2,994,243 | 8/1961 | Langstroth | 411/41 X |
| 3,362,737 | 1/1968 | Cobb | 403/408.1 X |
| 3,385,157 | 5/1968 | Rapata | 411/41 |
| 3,918,130 | 11/1975 | Poe | 411/41 X |
| 4,474,515 | 10/1984 | Pitzer | 411/60 X |
| 4,659,246 | 4/1987 | Sugiyama | 403/408.1 |
| 4,746,239 | 5/1988 | Marquardt | 403/408.1 X |
| 4,927,287 | 5/1990 | Ohkawa et al. | 411/41 X |
| 5,307,596 | 5/1994 | Bockmiller | 52/36.5 |

FOREIGN PATENT DOCUMENTS

| | | | |
|---|---|---|---|
| 1072619 | 2/1980 | Canada | 403/408.1 |
| 2308006 | 11/1976 | France | 411/41 |
| 3936425 | 5/1990 | Germany | 403/408.1 |
| 1207891 | 10/1970 | United Kingdom | 403/387 |

*Primary Examiner*—Harry C. Kim
*Attorney, Agent, or Firm*—Klarquist Sparkman Campbell Leigh & Whinston

[57] ABSTRACT

A sheet metal construction system is provided with a support strut having an elongated channel. A piece of sheet metal having an aperture is positioned on the strut with the aperture positioned over a portion of the channel. A rivet is received within the aperture and extends into the channel where it grips the strut. In this way, the aperture in the sheet metal can be positioned anywhere along the length of the channel and there is much greater freedom in the placement of rivets. The strut is also provided with channels for receiving braces and hangers for suspending a finished sheet metal product, such as a plenum for a clean room.

9 Claims, 3 Drawing Sheets

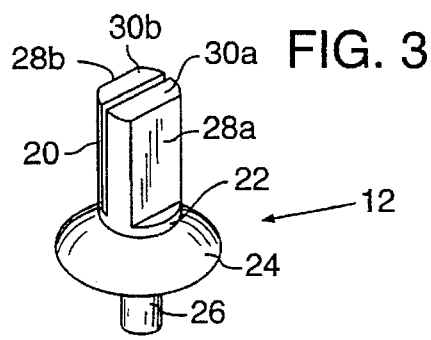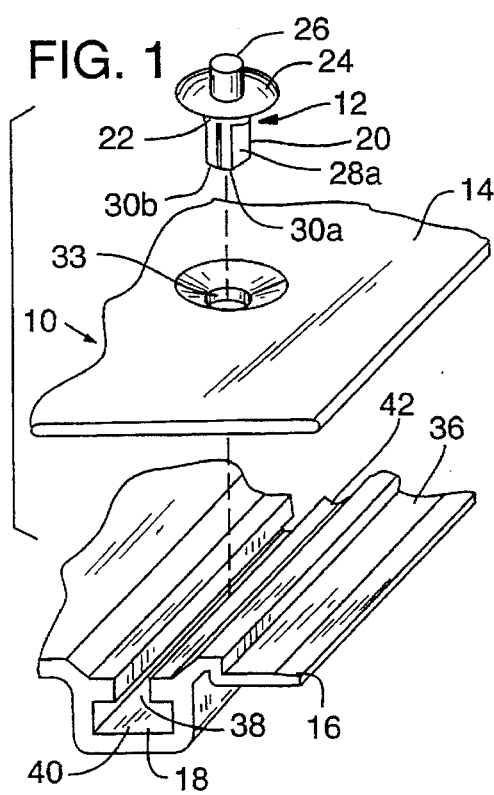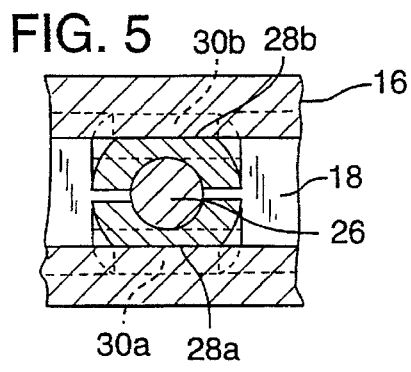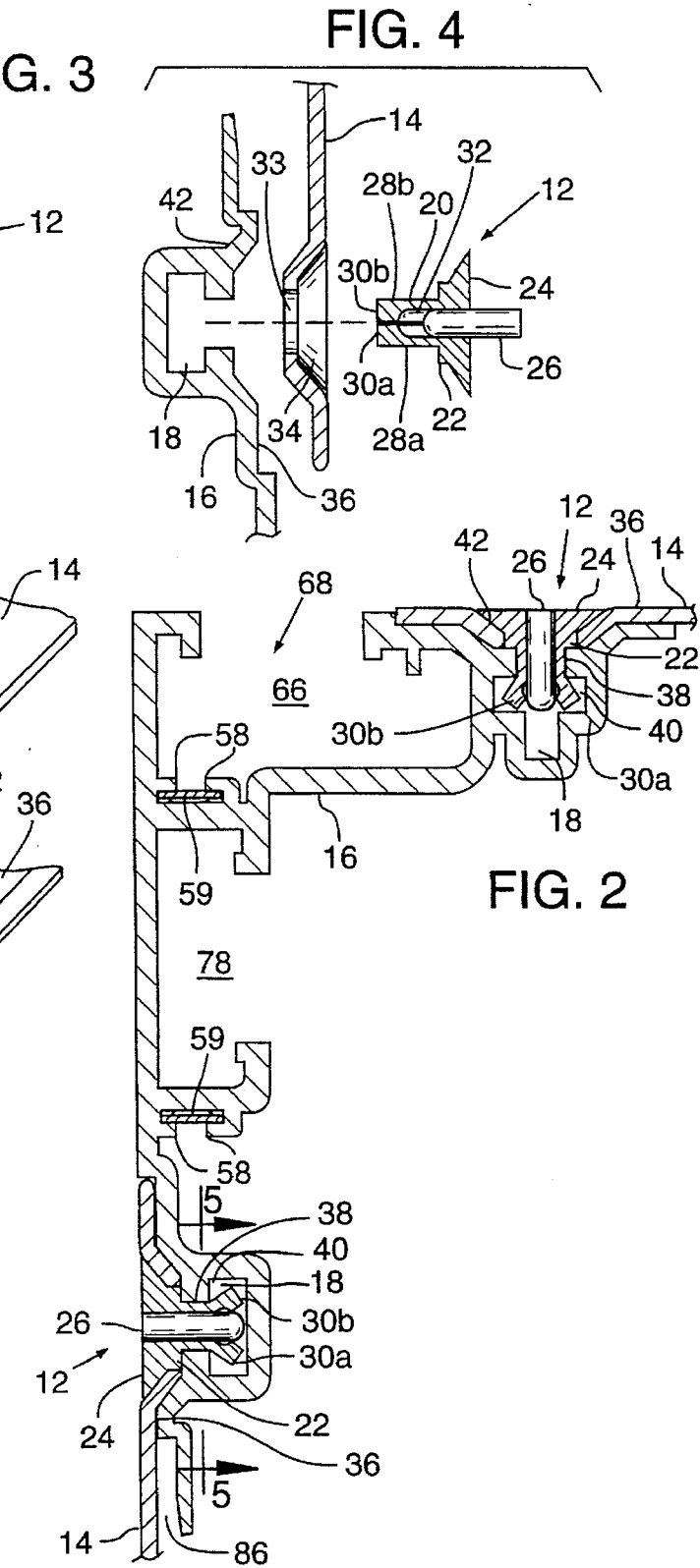

SHEET METAL CONSTRUCTION SYSTEM

BACKGROUND OF THE INVENTION

1. Field of the Invention

The present invention relates to sheet metal construction, and more particularly, to a unique sheet metal construction system in which sheet metal is secured to a support strut with a rivet that is received within an elongated channel formed in the support strut. The strut is also provided with channels for receiving fasteners or other devices such as braces and hangers for suspending a finished sheet metal product, such as a plenum for a clean room.

2. Description of Related Art

Sheet metal is a strong, lightweight material that is ideally suited for many types of construction. However, in some situations, sheet metal alone may not be strong enough to be self-supporting. For this reason, in many types of sheet metal construction, a sheet metal "skin" is secured over a frame of supporting struts. In this manner, the sheet metal provides a lightweight and easily contoured surface and the frame provides the necessary structural stability.

In such systems, the sheet metal can be attached to the frame by a variety of methods. For example, fasteners, such as metal screws, bolts, or rivets, can be used to fasten the sheet metal to the frame. Typically, the use of such fasteners requires that a hole be drilled or punched in the sheet metal and a corresponding hole be drilled or punched into the frame. The two holes are then aligned and the fastener is inserted into the hole to attach the sheet metal to the frame.

Although this type of construction is durable and strong, it can greatly complicate the construction process. For example, if the holes in the sheet metal and the frame are pre-punched or drilled, extremely tight tolerances must be maintained. Otherwise, the holes may not line up when the sheet metal is placed over the frame and it will be impossible to insert the fastener. Alternatively, the sheet metal can be placed over the frame and the holes drilled in place. This technique, however, may be labor intensive and slow. It also creates metal particles and filings that can contaminate the finished product. Such contamination is unacceptable in the construction of many sheet metal items, such as a plenum for a clean room.

SUMMARY OF THE INVENTION

Accordingly, it is an object of the present invention to provide a system of sheet metal construction that creates a strong, durable, and easily manufactured product.

It is a further object of the invention to provide a sheet metal construction system in which the sheet metal can be quickly and easily attached to a supporting frame.

A sheet metal construction system in accordance with one aspect of the present invention comprises a support strut having an elongated channel. A piece of sheet metal having an aperture is positioned with the aperture over a portion of the channel. A rivet is received within the aperture and extends into the channel where it grips the strut. In this way, the aperture in the sheet metal can be positioned anywhere along the length of the channel and there is much greater freedom in the placement of the aperture.

In accordance with another aspect of the invention, the strut is also provided with one or more channels for receiving fasteners, braces, hangers, or the like.

Other objects and aspects of the invention will become apparent to those skilled in the art from the detailed description of the invention which is presented by way of example and not as a limitation of the present invention.

BRIEF DESCRIPTION OF THE DRAWINGS

FIG. 1 is an exploded view of a sheet metal construction in accordance with a preferred embodiment of the present invention prior to expansion of the rivet.

FIG. 2 is a side cross-sectional view of a sheet metal construction in accordance with a preferred embodiment of the present invention.

FIG. 3 is a perspective view showing a rivet suitable for use in a preferred embodiment of the present invention.

FIG. 4 is an exploded view of a portion of the sheet metal construction of FIG. 2 prior to the expansion of the rivet.

FIG. 5 is a cross-sectional view taken along line 5—5 in FIG. 2.

DESCRIPTION OF THE ILLUSTRATED EMBODIMENT

Figure 6:
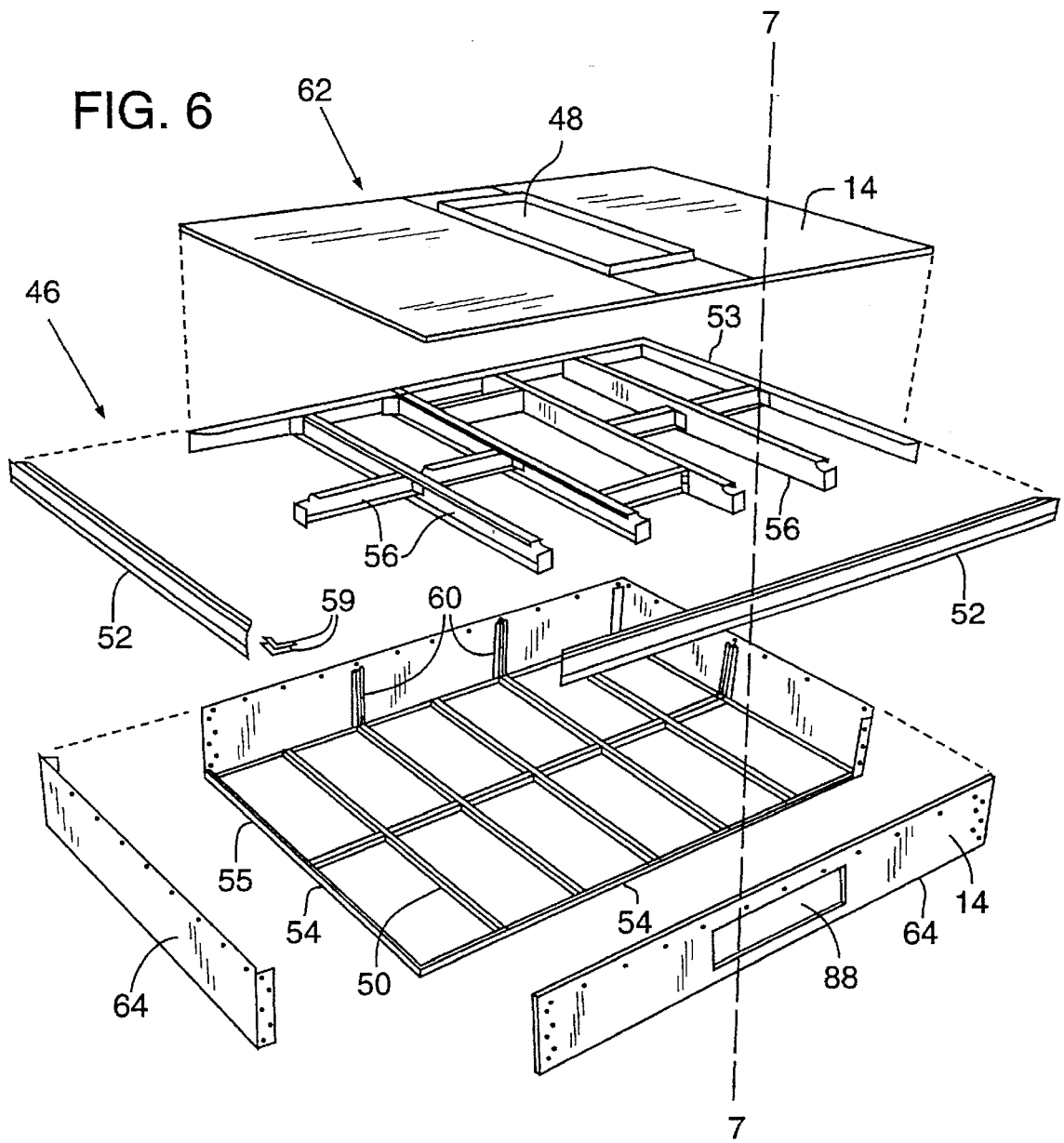
FIG. 6 is an exploded view of a plenum for a clean room made in accordance with a preferred embodiment of the present invention.

A sheet metal construction system in accordance with a preferred embodiment of the present invention is illustrated in FIG. 1 as reference numeral 10. In the illustrated embodiment, the system includes a rivet 12 which passes through a piece of sheet metal 14 and engages a support strut 16 to secure the sheet metal to the strut.

As illustrated in FIG. 2, the strut 16 is provided with a channel 18 formed along its length to receive the rivet 12. The base 20 of the rivet is expanded to securely grip the channel 18 and hold the sheet metal 14 in position. The use of the rivet receiving channel 18 allows the rivet 14 to be positioned virtually anywhere along the length of the strut 16. This flexibility in placement of the rivet eliminates the need to align corresponding holes in the sheet metal and the strut and greatly simplifies construction of sheet metal products.

The rivet 12, illustrated in FIG. 3, has a base 20, a body 22, a head 24, and a pin 26. The base 20 is generally the shape of a cylinder intersected by two parallel planes to create two flat sides 28a and 28b. The base is bisected along at least most of its length to create two generally symmetrical legs 30a and 30b.

As seen in FIG. 4, the body 22 of the illustrated rivet is intended to be received within an aperture 33 in the sheet metal. In the illustrated embodiment, the body is generally cylindrical so as to fit within a round aperture in the sheet metal. The length of the body is approximately equal to the thickness of the sheet metal 14. In other embodiments, the shape and length of the body may vary. For example, the shape may be rectangular to help prevent rotation of the sheet metal with respect to the strut. Similarly, the length may be increased or decreased depending on the thickness of the sheet metal being used.

The head 24 of the illustrated rivet is generally frusto-conical in shape. In the illustrated embodiment, the sheet metal 14 is provided with a dimple 34 surrounding the aperture 33. In this manner, the dimple 34 receives the head 24 so as to provide a smooth surface after the installation. Of course, in other embodiments it may be unnecessary or undesirable to provide such a dimple and rivets having other shapes may be desirable.

A central bore 32 extends through the head 24 and body 22 and partially into the base 20 of the rivet. The pin 26 is received in the bore 32. The end of the pin 26 within the base 20 is tapered or rounded and the other end extends outward from the head 24. In this manner, the extended end of the pin can be pushed inward, causing the tapered end of the pin to force the legs 30a and 30b of the rivet apart, as illustrated in FIG. 2.

A cross section of a strut in accordance with one embodiment of the invention is illustrated in FIG. 2. The illustrated strut is an aluminum extrusion intended to serve as an upper corner element for an air plenum or the like. Accordingly, the illustrated strut is provided with two perpendicular surfaces 36, each of which is adapted to receive a piece of sheet metal. However, a wide variety of strut configurations are possible.

Each sheet metal receiving surface 36 of the strut 16 is provided with a channel 18 extending along its length. The channel 18 has a narrow mouth 38 and opens into a larger chamber 40. The mouth 38 is sized so as to receive the unexpanded base 20 of the rivet and allow the legs of the rivet to extend into the chamber. In the illustrated embodiment, each sheet metal receiving surface is provided with a groove 42 above the channel 18. The cross-section of the groove is sized and shaped to receive the dimple 34 formed in the sheet metal. This can facilitate construction of the system by assisting with the alignment of the aperture over the channel.

To assemble the sheet metal construction, the piece of sheet metal 14 is placed over the strut 16 with the aperture 33 aligned over a portion of the channel 18. As illustrated in FIGS. 1 and 4, the rivet 12 is inserted through the aperture 33 so that the base 20 extends through the mouth 38 of the channel 18 and into the chamber 40. The pin 26 is then pushed inward to expand the rivet legs 30a and 30b outward within the chamber causing the legs 30a and 30b to grip the channel and hold the rivet and sheet metal in position, as illustrated in FIGS. 2 and 5.

As can be appreciated, with this system of sheet metal construction it is not necessary to align two apertures, one in the strut and one in the sheet metal.

Rather, it is only necessary to align the aperture in the sheet metal anywhere along the length of the channel. This not only simplifies the assembly process, but it facilitates sheet metal design by allowing much greater freedom in the placement of rivets.

In the illustrated embodiment, the flat sides 28a and 28b of the rivet fit snugly within the mouth of the channel. This prevents the rivet from rotating within the channel. In addition, the flat sides serve to increase the surface area of the rivet in contact with the channel and thereby increase the holding power of the rivet. Of course, other types and shapes of rivets may also be used.

The present system of sheet metal construction is ideally suited for construction of clean room plenums and other modular assemblies. One example of such a clean room plenum is indicated with reference numeral 46 in FIG. 6. The illustrated plenum has a top 62 and four side walls 64. The top may be provided with an opening for an inlet duct 48 to allow air to enter the plenum. The bottom of the plenum is an open grid 50. When the plenum is installed within a clean room ceiling system, an air filter (not shown) can be placed within each opening of the grid.

In a clean room ceiling system, plenums of this type are suspended side-by-side so that the open grid 50 of the adjacent plenums forms the clean room ceiling support structure. In such a system, known to those in the art, air is circulated through the clean room by blowing air into each plenum through the inlet duct 48, or through the sidewalls 64. The air exits the plenum downwardly through the filters in the grid 50 and passes into the clean room. In this way, the clean room is supplied with a constant source of clean, filtered air. The air is typically withdrawn from the clean room through the floor. This ceiling-to-floor air flow is an efficient means of trapping and removing contaminants and other particles from the clean room.

Figure 7:
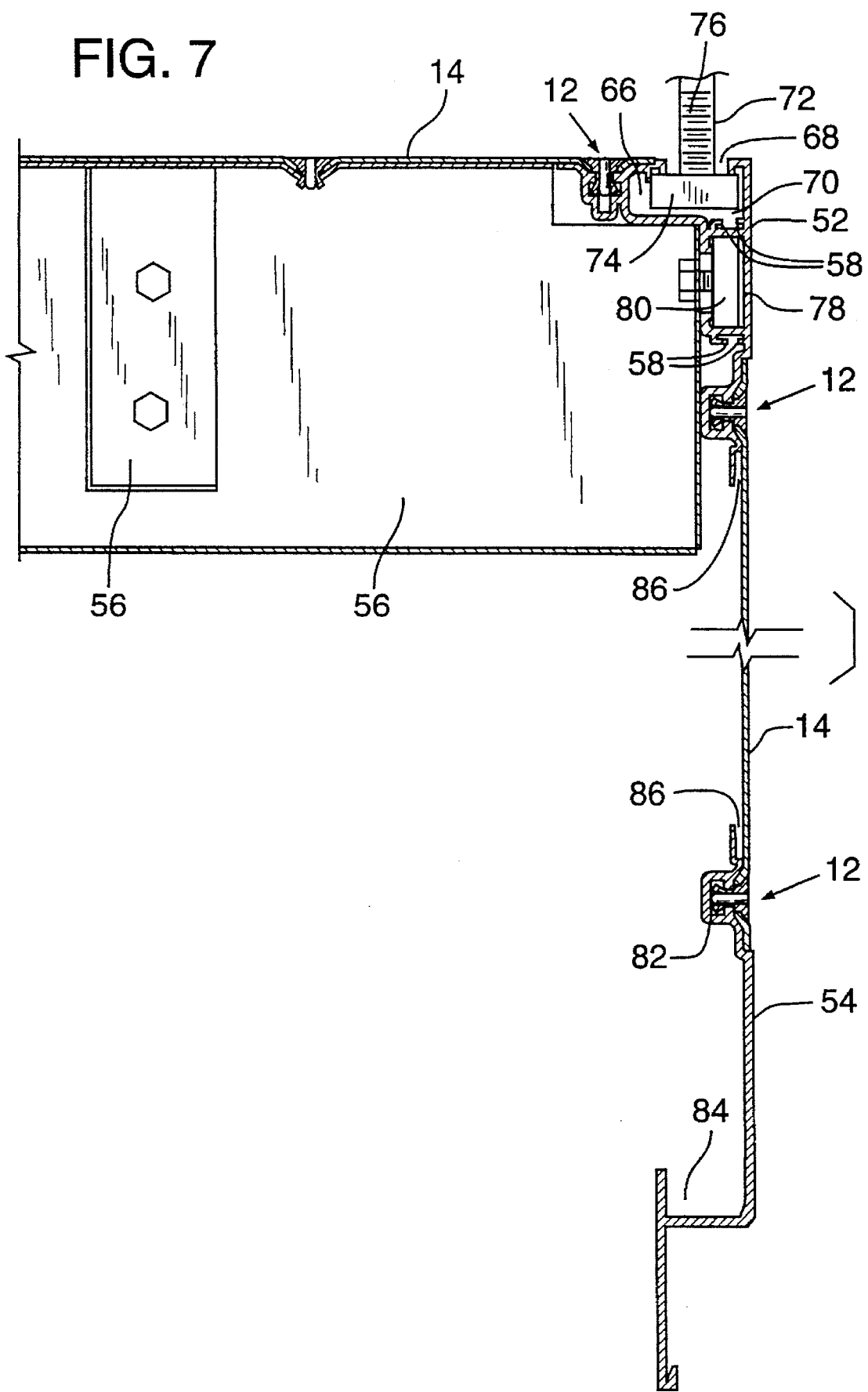
FIG. 7 is a cross-sectional view of a portion of the plenum illustrated in FIG. 6, taken along line 7—7.

In the illustrated clean room plenum 46, four upper perimeter struts 52 (seen in cross section in FIGS. 2 and 7) are connected end-to-end to form a rectangular upper frame 53. Similarly, four lower perimeter struts 54 (seen in cross section in FIG. 7) are connected end-to-end to form a lower frame 55. Roof support braces 56 extend across the upper frame 53 and one or more pieces of sheet metal 14 are attached to the upper frame and support braces to form the top 62 and enclose the top of the plenum (except for the inlet duct 48). Similarly, sheet metal 14 and wall stiffeners 60 extend from the lower frame 55 to the upper frame 53 to form the side walls 64 and enclose the sides of the plenum. As best seen in FIGS. 2 and 7, the sheet metal is attached to the upper frame 53 and lower frame 55 by rivets received in elongated channels in the manner described above.

Each upper perimeter strut 52, as best seen in FIGS. 2 and 7, is provided with two perpendicular sheet metal receiving surfaces 36. The top surface 36 receives the sheet metal that forms the top 62 and the side surface 36 receives the sheet metal the forms the side walls 64. In addition to the elongated rivet receiving channel 18, the top surface of each upper perimeter strut is provided with a hanger channel 66. This channel has a narrow mouth 68 and opens into a wider chamber 70 and is shaped to receive a hanger 72 for suspending the plenum.

In the embodiment illustrated in FIG. 7, the hanger includes a nut 74 positioned within the hanger channel 66. The nut fits within the chamber 70 and engages the narrow mouth 68. In the illustrated embodiment, the nut has a width small enough to fit through the narrow mouth 68 and a length that is longer than the width of the narrow mouth 68. In this manner, the nut 74 can be inserted into the channel and then twisted to engage the narrow mouth. Nuts of this type are well known in the art and are available from companies such as Unistrut. Of course other types of nuts or fasteners could also be used to engage the hanger channel 66. One end of a threaded rod 76 is threaded into the nut 74. The other end of the rod extends upward and connects to some type of support system to suspend the plenum.

In the illustrated embodiment, the hanger support channel 66 extends around substantially the entire upper perimeter of the plenum. This allows for hangers 72 to be positioned at any convenient location and greatly increases the flexibility and ease of installation of a clean room ceiling system. Of course the number and location of the hangers will vary depending on the size of the plenum and the types of hangers and support structure being used.

The side of each upper perimeter strut 52 is also provided with a channel 78 that faces inwardly. This channel 78 receives fasteners 80, such as a nut, for connecting the roof support braces 56 to the upper perimeter strut 52. Again the use of a channel that extends substantially around the inside perimeter of the upper frame provides a great deal of flexibility in the placement and spacing of the roof support braces. The roof support braces 56 of the illustrated embodiment are made of formed sheet metal. In the illustrated embodiment, the roof support braces are riveted to the top of the plenum and bolted to, each other.

Each of the upper perimeter struts 52 is also provided with two sets of opposing tabs 58. The tabs are configured to receive a clip fastener 59. The clip faster is a flat "L" shaped member having a number of protruding barbs. The clip can be used to connect adjacent upper perimeter struts together by sliding the legs of the clip fastener 59 beneath the opposing tabs 58 at the mitered ends of two adjoining upper perimeter struts 52. Once inserted, the protruding barbs frictionally engage the upper perimeter struts to hold them together.

Each of the lower, perimeter struts 54 is provided with a rivet receiving channel 82 for attaching the sheet metal side walls 64. Side wall stiffeners 60 formed of sheet metal can be riveted to the side walls 64 to provide additional support and rigidity. Each lower perimeter strut 54 is also provided with a filter supporting ledge 84 on its inner side.

As best seen in FIG. 7, the bottom of each upper perimeter strut 54 and the top of each lower perimeter strut is provided with a lip 86. The lip 86 is shaped to allow a piece of sheet metal (not shown) to be inserted between the lip and the side wall 64. In this way, an access hole 88 (seen in FIG. 6) can be provided in the side wall 64 and a sheet metal blank (not shown) can be inserted behind the lips 86 to block the access hole when desired. The access hole 88 may be provided to gain entry into the plenum or to allow the flow of air out of the plenum or into adjacent plenums.

This detailed description is set forth only for purposes of illustrating examples of the present invention and should not be considered to limit the scope thereof in any way. Clearly, numerous additions, substitutions, and other modifications can be made to the invention without departing from the scope of the invention which is defined in the appended claims and equivalents thereof.

I claim:

1. A system of sheet metal construction for a clean room plenum comprising:

a plurality of upper perimeter struts defining an upper frame of the plenum, each upper perimeter strut having:
   an upper sheet metal receiving surface;
   a first elongated channel defined in the upper sheet metal receiving surface, the first elongated channel having a mouth and a chamber that is wider than the mouth, the mouth being defined by two opposing generally parallel surfaces;
   a side sheet metal receiving surface, the side sheet metal receiving surface being generally perpendicular to the upper sheet metal receiving surface;
   a second elongated channel defined in the side sheet metal receiving surface, the second elongated channel having a mouth and a chamber that is wider than the mouth, the mouth being defined by two opposing generally parallel surfaces;

a plurality of rivets, each rivet having a head, a body, a base having two symmetrical legs, and a pin, the pin being movable from a first position to a second position in which the pin deforms the legs outward to expand the legs;

a first piece of sheet metal received on the upper sheet metal receiving surface, the first piece of sheet metal defining a first plurality of apertures, the first plurality of apertures positioned over the first elongated channel, wherein one of the plurality of rivets is received within each of the first plurality of apertures with the head positioned on one side of the first piece of sheet metal opposite the upper perimeter strut, the body extending through the aperture, and the base being received in the first elongated channel, the pin being in the second position such that the legs are deformed outward to engage the mouth of the first elongated channel to attach the first piece of sheet metal to the upper perimeter strut to form at least a portion of a top of the clean room plenum, the first elongated channel allowing the placement of one of said plurality of rivets at various positions along its length; and a second piece of sheet metal received on the side sheet metal receiving surface, the second piece of sheet metal defining a second plurality of apertures, the second plurality of apertures positioned over the second elongated channel, wherein one of the plurality of rivets is received within each of the second plurality of apertures with the head positioned on one side of the second piece of sheet metal opposite the upper perimeter strut, the body extending through the aperture, and the base being received in the second elongated channel, the pin being in the second position such that the legs are deformed outward to engage the mouth of the second elongated channel to attach the second piece of sheet metal to the upper perimeter strut to form at least a portion of a side wall of the clean room plenum, the second elongated channel allowing the placement of one of said plurality of rivets at various positions along its length.

2. The system of claim 1 further comprising a hanger receiving channel formed in the upper perimeter strut, the hanger receiving channel having a narrow mouth opening into a wider chamber, the hanger receiving channel opening upward toward the top of the plenum such that one or more hangers can be received within the channel and positioned at various positions along the length of the channel to suspend the plenum.

3. The system of claim 2 in which the plurality of rivets each has legs with generally flat sides capable of engaging the mouth of either the first or second elongated channel along substantially the entire width of the generally flat sides.

4. The system of claim 3 in which there are four upper perimeter struts, each strut having mitered ends and positioned to define a rectangular upper frame of the plenum.

5. The system of claim 4 further comprising:

at least one set of opposing tabs formed in each of the upper perimeter struts; and at least one clip having a plurality of protruding barbs, a first portion of the clip being positioned beneath the opposing tabs formed in a first one of the upper perimeter struts with at least some of the barbs engaging the first one of the upper perimeter struts and a second portion of the clip being positioned beneath the opposing tabs formed in a second one of the upper perimeter struts with at least some of the barbs engaging the second upper perimeter strut thereby joining the first upper perimeter strut to the second upper perimeter strut.

6. The system of claim 5 in which each said upper perimeter strut is a metal extrusion.

7. The system of claim 3 in which the upper perimeter struts further define a groove with the mouth being positioned at a base of the groove and in which a dimple which surrounds at least one of the plurality of apertures of the first or second piece of sheet metal is received within the groove when the aperture is positioned over the mouth.

8. The system of claim 7 in which the head of the rivet is shaped to be received within the dimple such that the head of the rivet does not protrude outward from the sheet metal.

9. The system of claim 8 in which the groove has a generally trapezoidal cross section, the dimple is generally frustoconical, and the head of the rivet is generally frustoconical.

* * * * *